United States Patent [19]

Lindsey

[11] 4,354,615

[45] Oct. 19, 1982

[54] ALTERNATOR MECHANISM FOR DISPENSING MACHINE

[75] Inventor: James C. Lindsey, Chattanooga, Tenn.

[73] Assignee: Cavalier Corporation, Chattanooga, Tenn.

[21] Appl. No.: 204,714

[22] Filed: Nov. 6, 1980

[51] Int. Cl.³ .............................................. B65H 3/44
[52] U.S. Cl. .................................. 221/116; 221/194; 221/294
[58] Field of Search ............... 221/112, 114, 115, 116, 221/117, 118, 131, 133, 194, 289, 294, 129

[56] References Cited

U.S. PATENT DOCUMENTS

| | | |
|---|---|---|
| 3,055,544 | 9/1962 | Krakauer et al. |
| 3,151,774 | 10/1964 | Payne |
| 3,158,289 | 11/1964 | Van Brunt ....................... 221/289 X |
| 3,209,945 | 10/1965 | Gasparini et al. ............... 221/112 X |
| 3,231,129 | 1/1966 | Craven et al. .................. 221/112 X |
| 3,276,624 | 10/1966 | Payne |
| 3,325,049 | 6/1967 | Craven et al. |
| 3,424,345 | 1/1969 | Payne |
| 3,498,497 | 3/1970 | Baxendale et al. ................... 221/116 |
| 3,537,330 | 9/1970 | De Shon |
| 3,627,172 | 12/1971 | Gore |
| 3,737,070 | 6/1973 | O'Neal |
| 3,810,560 | 5/1974 | Stegeman .......................... 221/116 |
| 3,869,064 | 3/1975 | Payne |

FOREIGN PATENT DOCUMENTS 319139  9/1929  United Kingdom ................ 221/114

Primary Examiner—Allen N. Knowles
Attorney, Agent, or Firm—Kerkam, Stowell, Kondracki & Clarke

[57] ABSTRACT

An article dispensing apparatus including a plurality of spaced vertically disposed inclined shelves, each shelf having a first and second side by side supporting surface adapted to support an associated first and second row of articles. First and second gate members are respectively located at the lower ends of the first and second support surfaces. Each gate member is shiftable between two opposite positions, a blocking position such that the lower most article in the associated row is blocked from moving off the lower end of the associated support surface, and a releasing position such that a lower most article in the associated row may freely move off the lower end of the associated support surface and into an escrow cradle which constitutes a common receiving area. An actuator cooperates with the gate members to provide for the shifting of the gate members upon the dispensing of an article, which is rotated out of an escrow cradle by a consumer.

26 Claims, 11 Drawing Figures

ALTERNATOR MECHANISM FOR DISPENSING MACHINE

BACKGROUND OF THE INVENTION

1. Field of the Invention

The present invention relates to a multi-level, gravity feed package or item merchandising machine and more specifically to an alternator mechanism for use with such a machine. The alternator mechanism alternately feeds soft drink cans or the like from two side by side inclined rows of articles.

2. Description of the Prior Art

The present invention is designed for use in conjunction with dispensing machines of the type described in U.S. Pat. Nos. 3,276,624, issued Oct. 4, 1966, and 3,869,064, issued Mar. 4, 1975, both invented by Harry R. Payne. Each of these patents is hereby incorporated by reference. These prior patents describe a dispensing machine having a plurality of spaced vertically disposed slanting shelves and a rotary receiver at the lower end of each of the shelves. The rotary receiver or escrow cradle provides for the transfer of one item, such as a soft drink can or bottle, from one of the shelves to a tray, whereupon the item will slide into a consumer accessible location. Alternately, the tray itself could be directly accessible. After the consumer has placed his money in the machine, a lockout mechanism ensures that he can only operate one rotary receiver or cradle and therefore only gets one soft drink for his deposited money. A depressable leg in each of the rotary receivers prevents the consumer from rotating a receiver unless the leg is depressed by a soft drink can in that receiver. This avoids the undesirable situation of the consumer rotating an empty cradle and thereby losing his money.

The prior art further includes patents which disclose dispensing machines having a plurality of side by side inclined rows of articles, wherein gravity is used to feed the articles towards the lower end of a slanted shelve. At the lower end of each of the inclined rows is a gate member, which is normally in a blocking position and which changes momentarily to a releasing position when a coin is inserted in the machine and the appropriate selector button is pushed. When the gate member shifts into the releasing position a single article is dispensed from the inclined row associated with that particular gate member. Instead of using a gate member which shifts between a blocking and releasing position, some machines use a fixed gate member in conjunction with a mechanism for lifting an article or otherwise allowing the article to get around the fixed gate member. Regardless of whether the gate member is fixed or movable, the arrangement often includes a mechanism for alternately feeding articles from the side by side inclined rows.

Among prior art U.S. Pat. Nos., Krakauer et al 3,055,544, Graven 3,325,049, DeShan 3,537,330, Gore 3,627,172, and O'Neal 3,737,070 disclose dispensing machines having a plurality of side by side inclined rows of articles with alternate feeding mechanisms. However, none of these patents discloses an alternator dispensing mechanism especially suitable for use with the rotary receiver or escrow cradle of the above-mentioned Payne patents.

Accordingly, an object of this invention is to provide a novel and improved alternator mechanism which alternately releases articles from a plurality of side by side inclined rows.

A further object of this invention is to provide an escrow cradle which can alternately be fed from one of a plurality of side by side rows of inclined articles.

Yet another object of this invention is to provide an alternator mechanism which is simply and effectively actuated by the rotation of an escrow cradle.

A still further object of this invention is to provide an alternator mechanism wherein the weight of articles in the inclined rows is used to assist the shifting of the alternator mechanism.

SUMMARY OF THE INVENTION

The above and other objects of the present invention are accomplished by an article dispensing apparatus including a plurality of spaced vertically disposed inclined shelves, each shelf having a first and second side by side supporting surface adapted to support an associated first and second row of articles. First and second gate members are respectively located at the lower ends of the first and second support surfaces. Each gate member is shiftable between two opposite positions, a blocking position such that the lower most article in the associated row is blocked from moving off the lower end of the associated support surface, and a releasing position such that a lower most article in the associated row may freely move off the lower end of the associated support surface and into an escrow cradle which constitutes a common receiving area. An actuator means cooperates with the gate members to provide for the shifting of the gate members upon the dispensing of an article, which is rotated out of an escrow cradle by a consumer. At least until one of the two side by side supporting surfaces is emptied of articles, each gate member will change its position upon the dispensing of an article from that shelf and the first and second gate members will always come to rest in opposite positions, thereby alternately supplying the escrow cradle with articles from the first and second rows. The dispenser mechanism further includes a depressable leg portion in each cradle, whereby the cradle will not rotate unless an article, such as a soft drink can, is disposed in that cradle.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment of the present invention taken in conjunction with the figures wherein like reference characters represent like parts throughout the several views.

DESCRIPTION OF THE PREFERRED EMBODIMENT

Figure 1A:
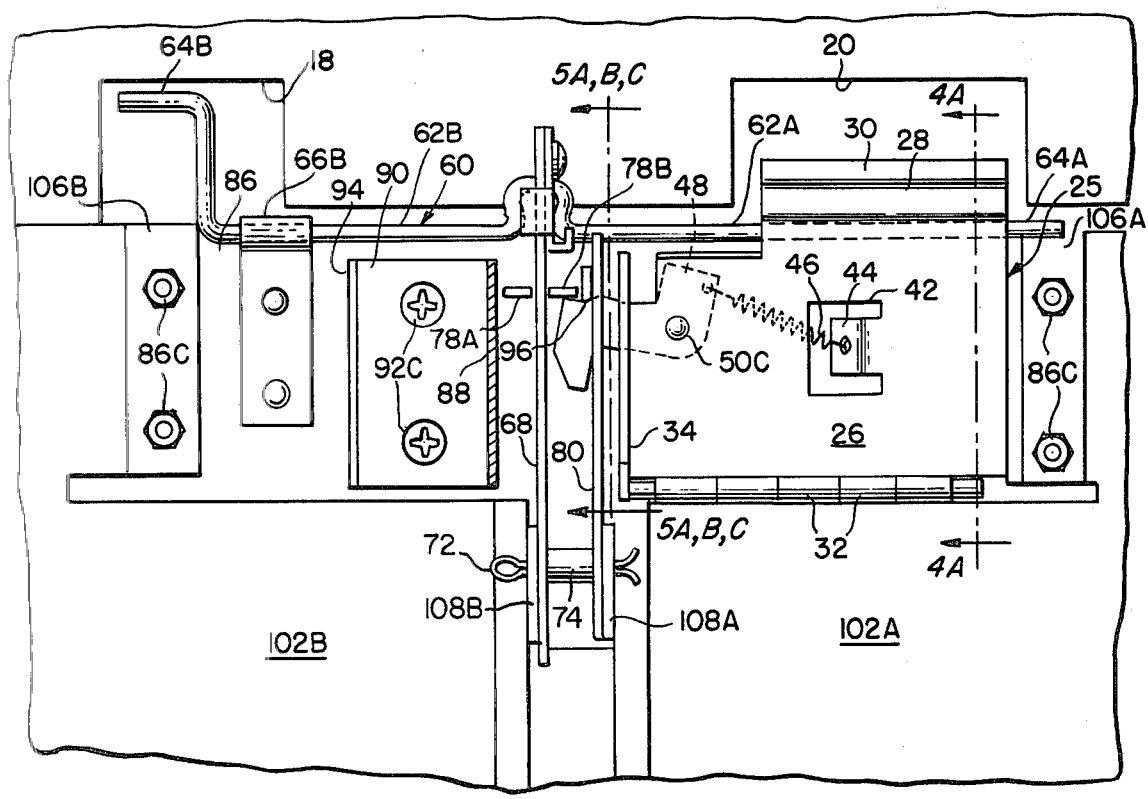
FIGS. 1A and 1B show planar top views of one inclined shelf and associated alternator mechanism according to the present invention, the views reflecting different modes or states of the alternator mechanism.

FIG. 1A shows a top planar view of a part of the present invention corresponding to a modification of one of the shelf members of the Payne U.S. Pat. No. 3,276,624. Specifically, a shelf 100, which is inclined from an upper end (not shown) to a lower end, is divided into two side by side supporting surfaces 102a and 102b. Each supporting surface is designed to accomodate an inclined row of articles, preferably cans. Separating the articles in one row from the articles in the other row are side rails 104a and 104b. In addition to side rails 104a and 104b, which are generally disposed in the middle of shelf 100, side rails (not shown) may also be used on the outer edges of the two supporting surfaces 102a and 102b. Flanges 106a and 106b, which are below and parallel to the planar surface of shelf 100, are used for connecting alternator support plate 86 by way of bolts or rivets 86c. Alternator support plate 86 is planar and just beneath the plane of shelf 100.

As seen in FIG. 1A, a hinge plate 25 is mounted on the right side of alternator support plate 86 by hinges 32. The hinges 32 allow hinge plate 25 to move between a lower or releasing position, which is substantially planar with shelf 100, and a blocking or upper position, whereat hinge plate 25 extends up and out of the plane of shelf 100. Similarly shiftable between an upper blocking position and a lower releasing position is an L shaped blocking part 64b which constitutes a part of a vend rod 60. As shown in FIG. 1A, the hinge plate 25 is in its blocking position and vend rod 60 is in a release position, meaning that the L of blocking part 64b is substantially planar with shelf 100.

A general overview of the operation of the present invention is useful at this point. Soft drink or other cans (not shown in FIG. 1A) are placed in a row on supporting surface 102a, which surface is inclined towards hinge plate 25. Likewise, cans would be placed on supporting surface 102b which is inclined towards blocking part 64b of vend rod 60. Blocking part 64b of vend rod 60 will be in a lower or release position when hinge plate 25 is in an upper or blocking position, as shown in FIG. 1A. A can may then be fed from the inclined row associated with supporting surface 102b. The can will simply roll over the lowered blocking part 64b and into an escrow cradle 10 (only partially shown). When the escrow cradle is rotated to allow the soft drink can placed therein to fall into the tray or spaced platform member such as shown in Payne U.S. Pat. No. 3,276,624. The alternator mechanism will be reset such that vend rod 60 will be in a blocking position with blocking part 64b extending up and out of the plane of shelf 100 and hinge plate 25 now in a releasing position substantially planar with shelf 100. Note that if the platform member or tray is to be directly accessible (as opposed to allowing the can to slide into a consumer accessible location), it is desirable to have one platform member for every two escrow cradles instead of the one-to-one relationship shown in Payne U.S. Pat. No. 3,276,624, thus allowing the consumer to reach cans coming down from the back row. A soft drink can from the inclined row associated with supporting surface 102a will then roll over hinge plate 25 and into the escrow cradle. Upon the next rotation of the escrow cradle by a purchasing consumer, the alternator mechanism will be reset to the position shown in FIG. 1A, with vend rod 60 in the release position and hinge plate 25 in the upper or blocking position.

Figure 1B:
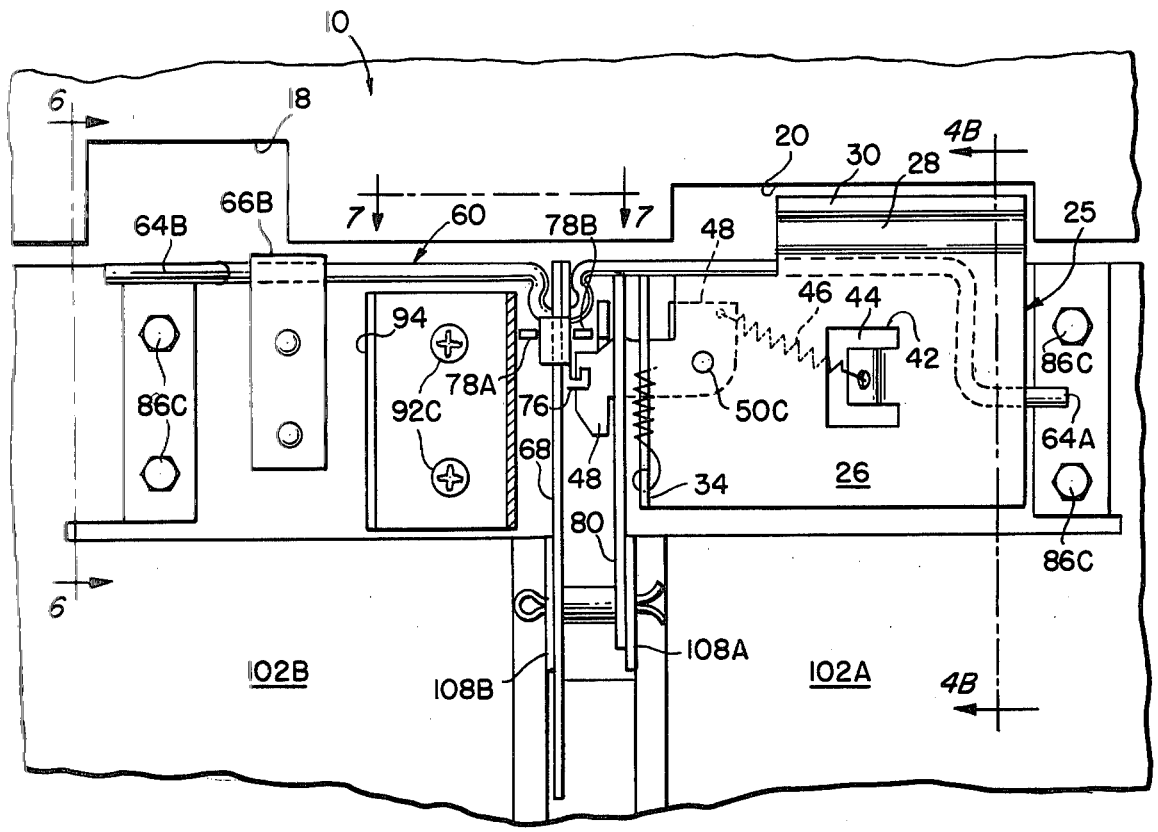
Figure 2:
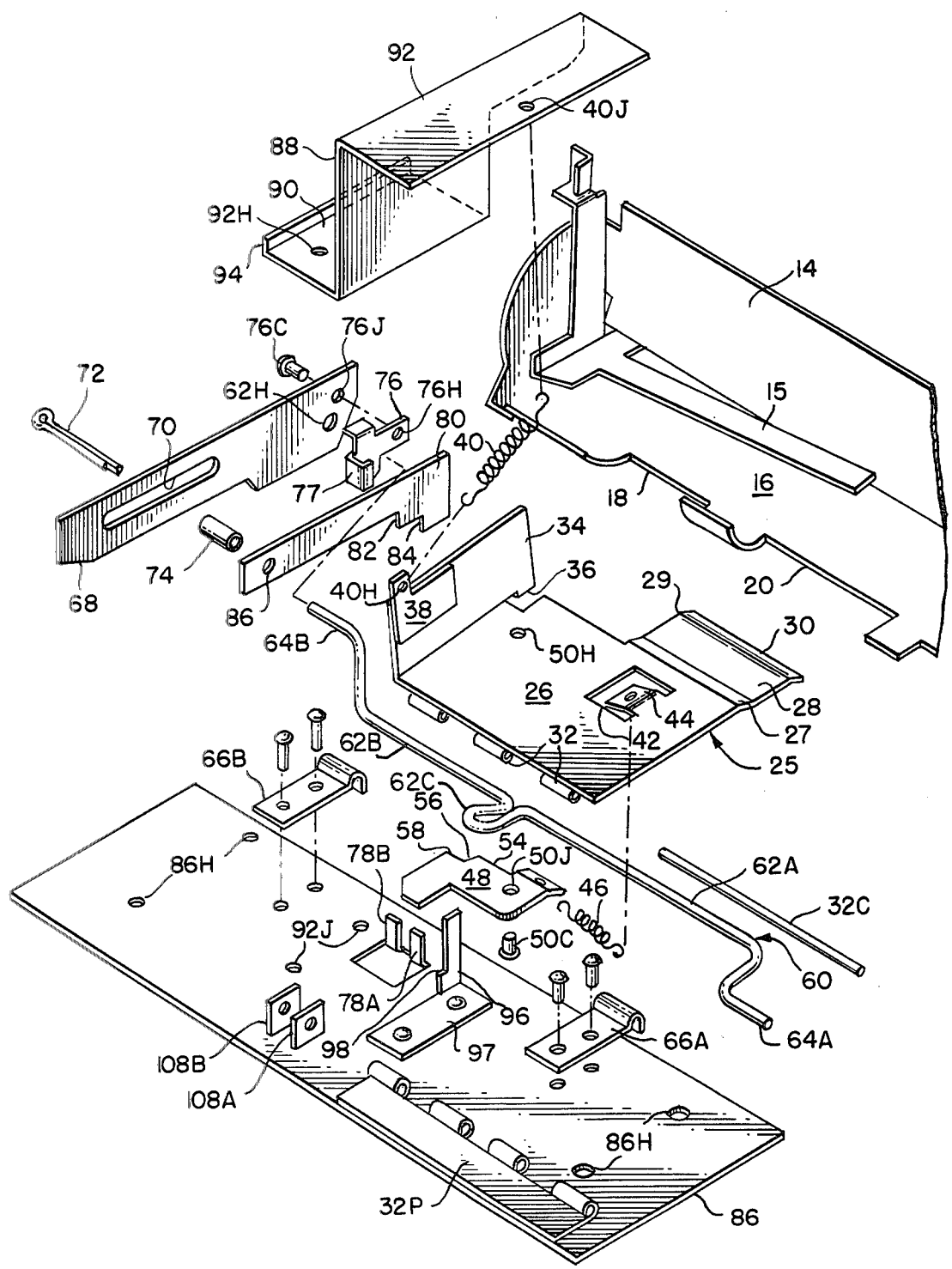
FIG. 2 is an exploded perspective view looking from a upper rear side at parts of the present invention.
Figure 3:
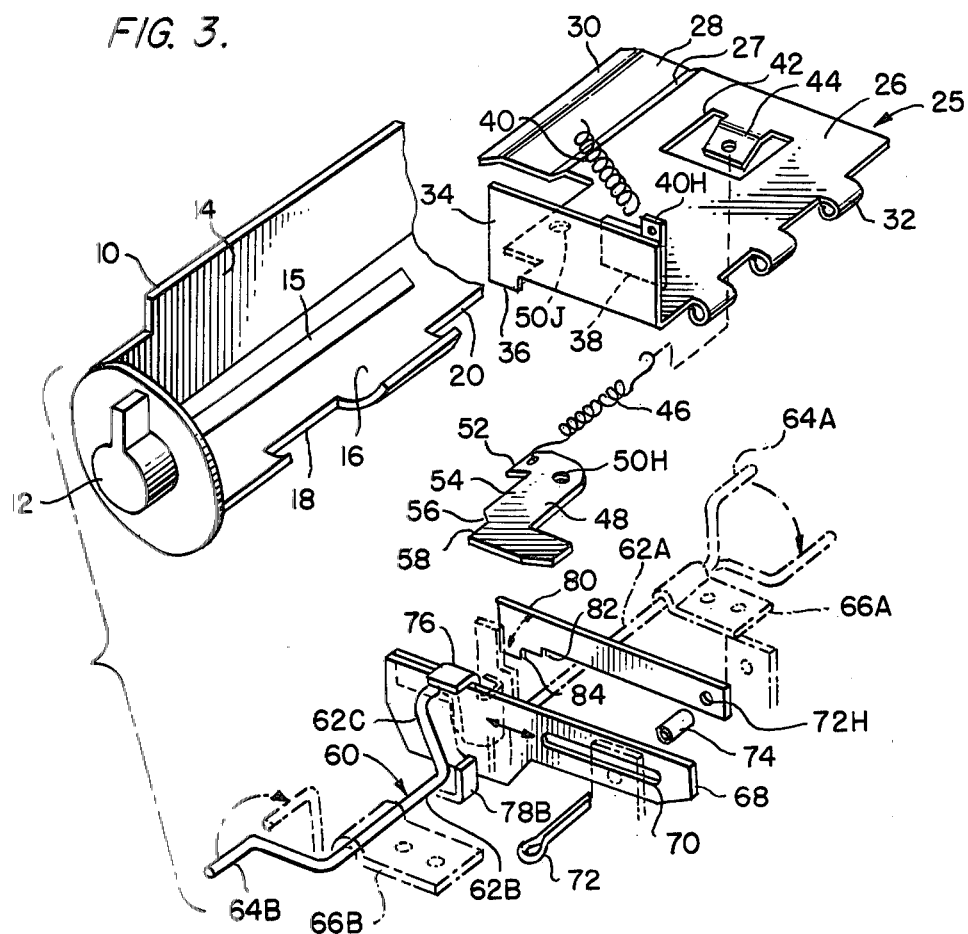
FIG. 3 is an exploded perspective view of parts of the present invention looking from the upper rear side opposite the side of FIG. 2.

Continuing to view FIG. 1A, but also considering the views of FIGS. 2 and 3 in conjunction therewith, a detailed discussion of the parts of the present invention will commence. FIG. 2 which is an exploded perspective view looking from the lower right of FIG. 1A, shows the alternator support plate 86 and the parts mounted thereon along with the escrow cradle 10. FIG. 3 shows a partially exploded perspective from the lower left of FIG. 1A and deleting several parts for clarification. The escrow cradle 10 would be mounted for rotation just below the lower edge of shelf 100 in the manner shown in the above noted U.S. Pat. No. 3,276,624. Vend rod 60 includes two colinear straight shaft sections 62a and 62b which define an axis of rotation and are separated by a loop or curved portion 62c. An L shaped blocking part 64b is at the outside end of shaft section 62b, whereas an L shaped gate coacting part 64a of vend rod 60 is situated at the outside end of shaft section 62a. As will be discussed below, L shaped part 64a cooperates with hinge plate 25. Vend rod mounting plates 66a and 66b secure vend rods 60 for rotation at the lower edge of support plate 86. (Curved portion 62c of vend rod 60 extends through hole 62h of slider 68. Slider 68, which accomodates cotter pin 72 in enlongated hole 70 will thus slide back and forth with the rotation of vend rod 60. Release member 76 is pivotably connected to slider 68 by connector 76c and associated holes 76j and 76h. A release surface 77 on releasing member 76 is used to release a latching member which holds hinge plate 25 in its blocking position, as will be discussed below. Cotter pin 72 extends from flange 108b through hole 70 in slider 68, sleeve member 74, a hole 86 in antilatching member 80, and flange 108a. When vend rod 60 is rotated, slider 68 will thus move back and fourth in a track defined by cotter pin flange 108b sleeve 74 and slider restraining flanges 78a and 78b. Side wall 88 (shown in cross section in FIG. 1A) and top piece 92 (not shown in FIG. 1A) are attached to alternator support plate 86 by bolts 92c which extend from holes 92h in mounting piece 90 through holes 92j in alternator support plate 86. Ridge 94 extends up from mounting piece 90 such that cans may freely roll above bolts 92c and 86c. Top piece 92 includes a hole 40j for connecting hinge plate spring 40. Top piece 92 and spring 40 are, of course, not shown in FIG. 1 in order to clarify the operation of the parts lying under top piece 92. It will however be appreciated from the exploded views of FIGS. 2 and 3 that spring 40 biases hinge plate 25 by way of offset plate 38 in a downward direction such that the hinge plate 25 will tend to lie substantially parallel and planar with the plane of supporting surface 102a.

In order to facilitate shifting of the alternator mechanism, the lower edge of hinge plate 25 includes a portion which extends beyond the edge of alternator support plate 86 when the hinge plate 25 is in its lower or releasing position. Specifically, the hinge plate includes a curved down portion 27, followed by a flat portion 28 which is parallel to the plane of the main surface 26 of hinge plate 25, and which is in turn followed by a curved down portion 29. A cut out portion 42 includes a downwardly extending flange 44 which is attached to a pivot plate spring 46. At the other end of spring 46 is pivot plate 48, which is pivoted about connector 50c disposed through holes 50j and 50h. Pivot plate 48 serves as a latching member to latch hinge plate 25 in an upper blocking position, as will be discussed in detail below. Pivot plate 48 includes an antilatching edge 54, a latching edge 56, and a releasing edge 58 which interact respectively with antilatching member 80, latching edge 98 of latching support piece 96, and release surface 77 of release member 76. Vend rod mounting plate 66a and stop part 36 of hinge plate side wall 34 hold the hinge plate 25 high enough above alternator support plate 86 such that pivot plate 48 and pivot plate spring 46 are not constrained or flattened in between the hinge plate 25 and alternator support plate 86.

Figure 4B:
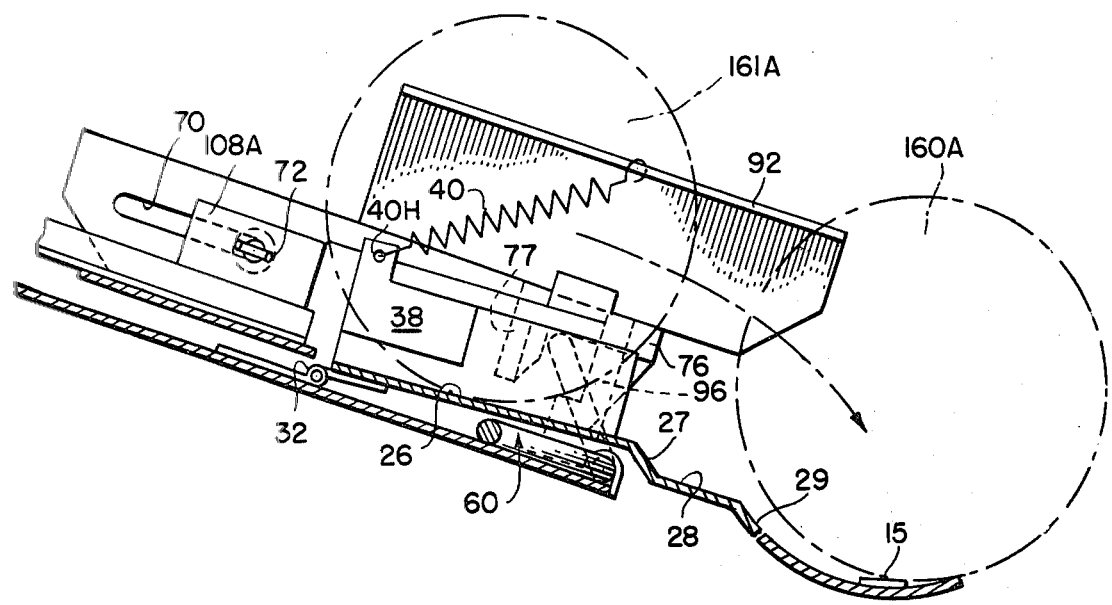
FIGS. 4A and 4B are cross sectional side views taken respectively along lines 1A—1A and 1B—1B.
Figure 4A:
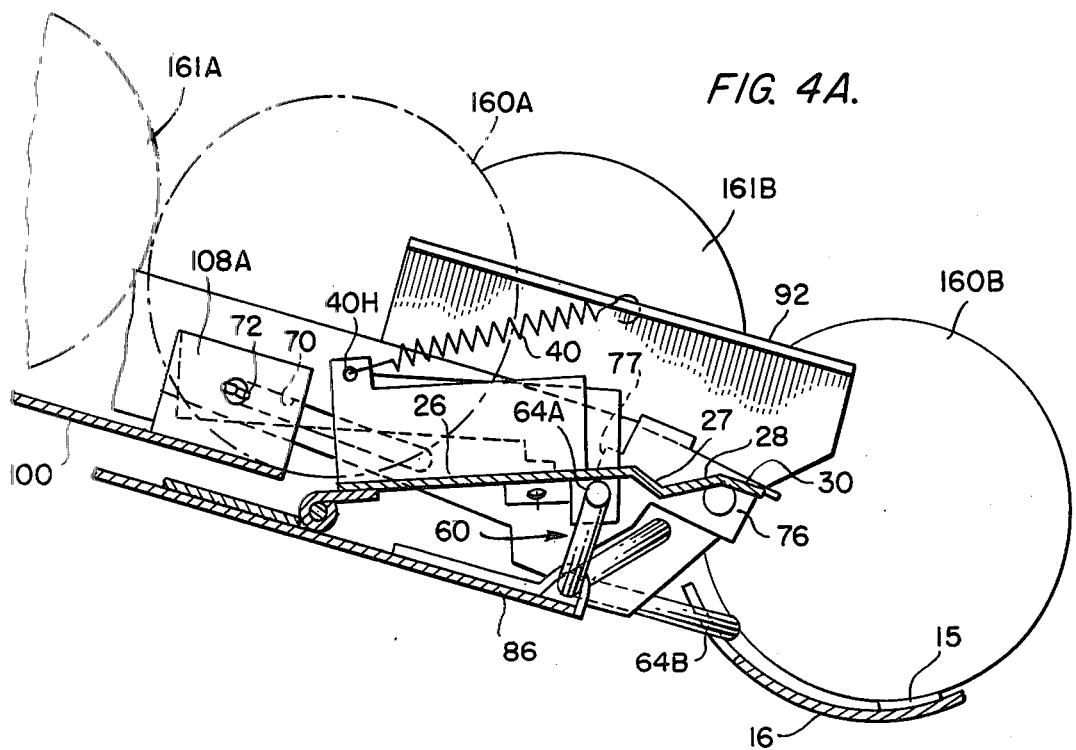

Continuing to consider the exploded views of FIGS. 2 and 3, the operation of the present invention will presently be discussed in conjunction with the other views. Specifically, as discussed above, FIG. 1A shows a top view of the shelf 100 and associated alternator mechanism of the present invention, with hinge plate 25 in an upper or blocking position and blocking part 64b of vend rod 60 in a release or lower position. FIG. 4A shows a side cross section view along lines 4A—4A of FIG. 1A with cans 160a and 161a lying on support surface 102a and cans 160b and 161b lying on or originating from support surface 102b. In this mode the blocking part 64b is held in a lower or release position by the weight of soft drink can 160b which is in the half of escrow cradle 10 adjacent and just below supporting surface 102b. Soft drink can 160b pulls down depressable leg 15 in escrow cradle 10 in the same fashion as described with respect to the depressable leg of the above mentioned Payne U.S. Pat. No. 3,869,064. Blocking part 64b extends out and below the lower edge of alternator support surface 86 and extends towards the recessed actuator edge 18 of escrow cradle or rotary receiver 10. After a consumer has inserted the appropriate amount of money, the locking mechanism of the above-described Payne patent and U.S. Pat. No. 3,276,624 allow cradle 10 to be rotated clockwise about 90 degrees (as viewed from FIG. 4A). The cradle 10 is spring-biased to snap back to its at rest position as described in Payne U.S. Pat. No. 3,276,624. As blocking part 64b of vend rod 60 engages actuator edge 18 of cradle 10, only one can from the row associated with supporting surface 102b will be free to roll into a tray or platform member as described in Payne U.S. Pat. No. 3,276,624. The lifting of blocking part 64b of vend rod 60 by actuator edge 18 of escrow cradle 10 causes coacting part 64a of vend rod 60 to be lowered into a flat position. At the same time actuator edge 20 of escrow cradle 10 contacts and lifts the lower dispensing end 28 of hinge plate 25 above its at rest blocking position. Furthermore, the rotation of vend rod 60 causes slider 68 to move up the incline (downward in the view of FIG. 1A and towards the upper left in the view of FIG. 4A) whereby release surface 77 of release member 76 engages release edge 58 of pivot plate 48, turning pivot plate 48 is a counterclockwise (FIG. 1) direction. As latching edge 56 of pivot plate 48 becomes disengaged with latching edge 98 of latching support 96, antilatching edge 54 of pivot plate 48 will become further removed from latching edge 84 of antilatching member 80. Upon the further counterclockwise (as seen in FIG. 1A) rotation of pivot plate 48 antilatching edge of pivot plate 48 will be drawn behind (towards the lower left in FIG. 2) antilatching edge 82 of antilatching member 80. Once this happens, antilatching member 80 will drop down such that antilatching edge 54 of pivot plate 48 will now be in contact with antilatching edge 82 of antilatching member 80.

Figure 5A:
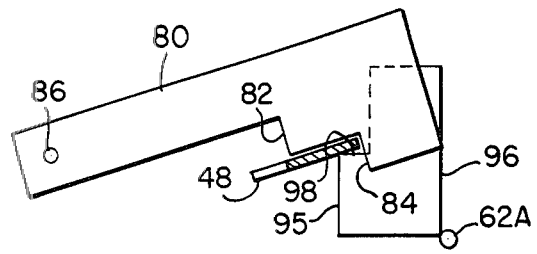
FIGS. 5A, 5B, and 5C shows several positions assumed by the latching member and associated components as seen from lines 5A, B, C-5A, B, C of FIG. 1A.

The specific relationship between antilatching member 80, pivot plate 48 and latching support piece 96 is more clearly shown in FIGS. 5A, 5B, 5C and 8B, which show the view taken along lines 5A, B, C-5A, B, C of FIG. 1A and with only those parts and shaft 62A shown for simplicity. FIG. 5A shows the view with pivot plate 48 engaging the latching edge 98 of latching support 96. In this position, the hinge plate 25 will be held in the upper or blocking position by the spring 46 biasing pivot plate 48 to rest on edge 98 as shown. Latching edge 84 of antilatching member 80 is adjacent pivot plate 48 in this position with edge 83 resting on pivot plate 48.

Figure 5B:
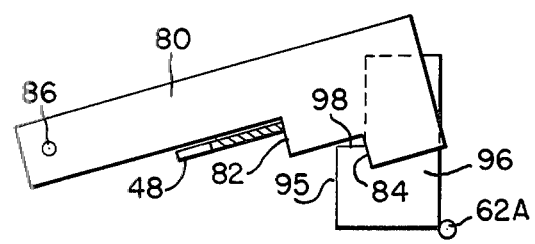
Figure 5C:
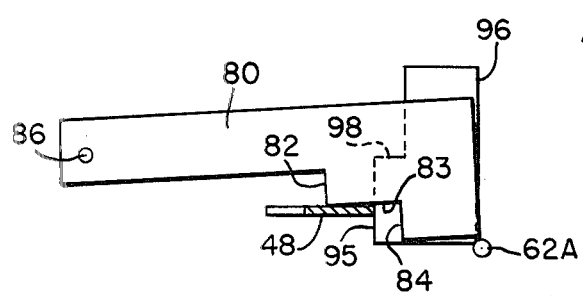

As that part of pivot plate 48 shown in FIGS. 5A, 5B and 5C is moved to the left by releasing member 76 (not shown in FIGS. 5A, 5B and 5C), antilatching member 80 will drop down such that antilatching edge 82 will now be engagement with pivot plate 48. As evident from FIG. 5B, the engagement between pivot plate 48 and antilatching edge 82 of antilatching member 80 will then prevent pivot plate 48 from latching onto latching support piece 96 as the hinge plate 25 falls into a releasing or lower position. However, once hinge plate 25 has dropped below edge 83, pivot plate 48, no longer restrained by antilatching edge 82, will move to its right as shown in FIG. 5C.

Figure 7:
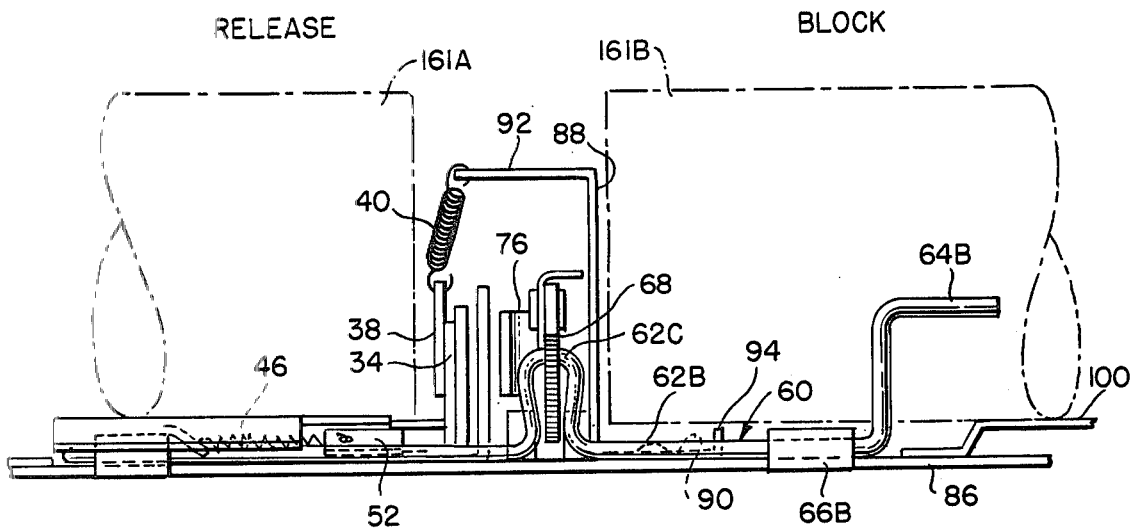
FIG. 7 is a planar front view taken parallel to the plane of the shelf of the alternator mechanism according to the present invention.
Figure 6:
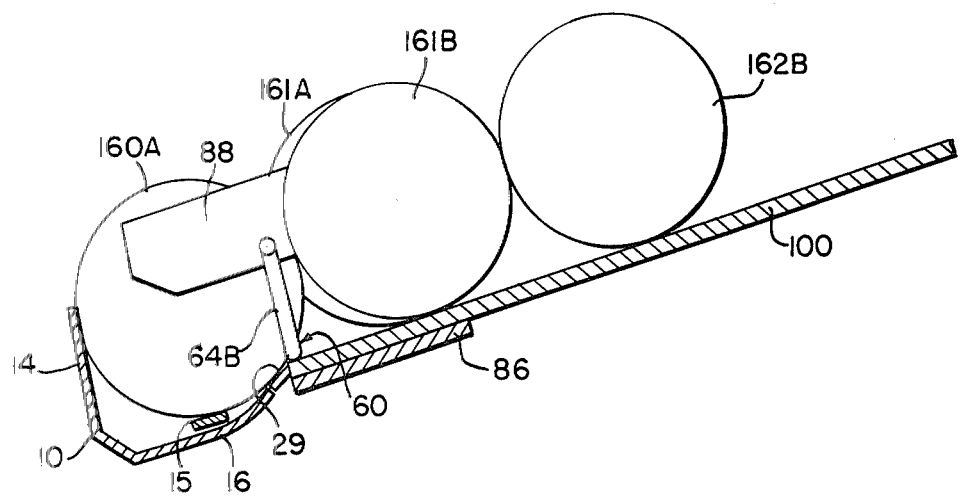
FIG. 6 is a cross sectional view taken along lines 6—6 of FIG. 1B.

Following the above described sequence of events, the hinge plate 25 of the alternator mechanism will no longer be in the blocking or upper position shown in FIGS. 1A and 4A. Instead, the alternator mechanism will be in the state shown by FIGS. 1B, 4B, 6, and 7. FIGS. 1B and 4B are taken from the same views used for FIGS. 1A and 4A respectively, the differences reflecting the change in state of the alternator mechanism. FIG. 6 shows the view from 6—6 of FIG. 1A, whereas FIG. 7 is the view from lines 7—7 of FIG. 1B.

When hinge plate 25 is in a lower or releasing position, it will tend to hold vend rod 60 in a blocking position. In particular, hinge plate 25 will tend to hold coacting part 64a of vend rod 60 in a flat position as is especially evident in FIGS. 1B and 4B. In addition to the weight of hinge plate 25 and the biasing of spring 40, hinge plate 25 will be held in a lower position by soft drink can 160a (FIG. 4B) which is partly on top of part 29 of hinge plate 25. Accordingly, hinge plate 25 and coacting part 64a of vend rod 60 are held in a lower position, whereas blocking part 64b of vend rod 60 is held in a blocking or upper position, as is especially evident in FIGS. 6 and 7.

As appears in FIGS. 4B and 6, the shift of the hinge plate from the blocking to the releasing mode has allowed a single can, 160a, to roll into the escrow cradle. Unlike the relatively short depressable leg of the above mentioned Payne U.S. Pat. No. 3,869,064, the depressable leg 15 of the present invention is longer than an individual soft drink can. The depressable leg 15 may then be depressed to sense a soft drink can rolling into the escrow cradle from either of the two parallel supporting surfaces 102a and 102b. When the alternator mechanism is in the stage shown in FIGS. 1B, 4B, 6 and 7, the presence of soft drink can 160a will then depress the leg 15 (FIGS. 6 and 7) and thereby allow rotation of the escrow cradle 10 upon insertion of the appropriate amount of money. The rotation of escrow cradle 10 (in a clockwise direction with respect to the view of FIG.

4B and a counterclockwise direction with respect to the view of FIG. 6) will allow can 160a to be dispensed according to the principles of operation described in the above discussed Payne U.S. Pat. No. 3,276,624. As the same time, actuator edge 20 (referring back momentarily to FIGS. 2 and 3) will engage hinge plate 25 thereby lifting it up. It will be recalled that blocking part 64a of vend rod 60 is already in its upper position and is therefore not engaged by edge 18 of escrow cradle 10.

Referring again to FIG. 5C, which shows a view taken along lines 5—5 of FIG. 1A, the consequences of the engagement between edge 20 and hinge plate 25 will be considered. The view of FIG. 5C shows the relationship between pivot plate 48 antilatching member 80 and latching support 96 as the hinge plate 25 (not shown in FIG. 5C) begins to hinge upwardly in response to engagement with actuator edge 20 of escrow cradle 10. As shown, pivot plate 48 initially is lifted up as it rides along edge 95 of latching support 96, it being understood that pivot plate 48 will of course move with hinge plate 25. Upon contact between pivot plate 48 and edge 83 of antilatching member 80, further upward movement of pivot plate 48 will then lift antilatching member 80 which pivots about point 86. Once pivot plate 48 has been lifted high enough to clear edge 95, it will snap into the position shown in FIG. 5A, thereby latching hinge plate 25 into an upper to blocking position. Note that as pivot plate 48 moves up, the pivoting of release member 76, which would then be above pivot plate 48 as best shown in FIG. 1B, avoids the possibility that the pivot plate 48 would be constrained by release member 76.

Pivot plate 48 will thus latch hinge plate 25 into an upper or blocking position by the above described sequence of operations. Accordingly, as escrow cradle 10 returns into its rest position by rotation (clockwise as viewed in FIG. 6, counterclockwise as viewed in FIG. 4B), hinge plate 25 will be lowered only as far as permitted by the latching of pivot plate 48 shown in FIG. 5A. Further, since hinge plate 25 is no longer holding coacting part 64a of vend rod 60 in a lower position, the weight of articles 161b and 162b will now force blocking part 64b of vend rod 60 back into the lower or releasing position shown in FIG. 1A. This will allow soft drink can 161b to roll into the escrow cradle in the position formerly held by soft drink can 160b shown in FIG. 4A. The sequence of operations may then be repeated with the alternator mechanism supplying soft drink cans from the two side by side rows in an alternating fashion.

Conceptually then, the vend rod 60 and hinge plate 25 may be considered as first and second gate members which alternately release cans from respective first and second side by side rows of articles resting on associated supporting surfaces. Each gate member may be considered as having a blocking position which prevents the lower most article in the associated row from moving off the lower end of the associated support surface and a releasing position such that a lower most article in the associated row may freely move off the lower end of the associated support surface. The escrow cradle may be considered as a common receiving area located adjacent the lower ends of the two side by side supporting surfaces and being adapted to received articles which have moved off the lower ends of the supporting surfaces. The edges 18 and 20 of escrow cradle 10 may be considered as an actuator means which cooperates with the two gate members to provide for the shifting of the gate members upon the dispensing of an article from the dispensing assembly. The vend rod and hinge plate are adapted to cooperatively and alternately shift between opposite positions such that, until at least one of the supporting surfaces is emptied of articles, each gate member changes its position upon the dispensing of an article and the gate members always come to rest in opposite positions, thereby alternately supplying the common receiving area of escrow cradle with articles from the two side by side rows.

The reason that the shifting of the alternator mechanism will depend, at least to some extent, on the present of articles in the rows should be evident by referring to FIGS. 1B, 4B, 6 and 7. As is especially apparent in FIG. 6, cans 161b and 162b have the tendency to shift vend rod 60 from its blocking position to its lower or dispensing position. However, counter balanced against the weight applied to blocking part 64b of vend rod 60 by cans 161b and 162b, is the weight of cans 160a and 161a (FIGS. 4B and 6) which will keep vend rod 60 in its blocking position, until hinge plate 25 is latched in its upper or release position.

Although specific constructions have been shown for a preferred embodiment of the present invention, it is to be appreciated that these specifics are for illustrative purposes. Modifications in the present invention will readily apparant to those with skill in this field. In particular, although the present invention has been described specifically with reference to cans, it is to be understood that the present invention has applicability to the dispensing of bottles. Moreover, although the present invention is especially suited for items having cylindrical cross section such that they may roll down an inclined shelf, the present invention is also applicable to items sold or dispensed in cartons, where the cartons slide down an inclined shelf. The presently disclosed inventive concepts thus being readily adaptable, the scope of the present invention should be determined by reference to the appended claims.

I claim:

1. An article dispensing apparatus including a dispensing assembly comprising:
   (a) first and second side by side supporting surfaces adapted to support associated first and second row of articles, each supporting surface inclined from an upper end to a lower end,
   (b) first and second gate members respectively associated with said first and second support surfaces, each gate member located adjacent the lower end of the associated support surface, and shiftable between two opposite positions:
      (i) an upper blocking position such that a lowermost articles in the associated row is blocked from moving off the lower end of the associated support surface,
      (ii) a lower releasing position such that the gate member does not block the lowermost article in the associated row from freely moving off the lower end of the associated support surface,
   (c) a common receiving area located adjacent the lower ends of said first and second supporting surfaces and adapted to receive articles which have moved off of the lower ends of the first and second supporting surfaces, and
   (d) an actuator means cooperating with the gate members to provide for the shifting of the gate members upon the dispensing of an articles from the dispensing assembly, and wherein the first and second gate members are adapted to cooperatively and alternately shift between opposite positions such that, until at least one of said support surfaces is emptied of articles, each gate member changes its position upon the dispensing of an article from the dispensing assembly and the first and second gate members always come to rest with one of the first and second gate members in its upper blocking position and the other of the first and second gate members in its lower releasing position, thereby alternately supplying said common receiving area with articles from the first and second rows.

2. The article dispensing apparatus of claim 1 wherein, within said dispensing assembly, said common receiving area is an escrow cradle mounted for rotation and adapted to transfer an article from said cradle to a discharge area upon rotation of said escrow cradle.

3. The article dispensing apparatus of claim 2 wherein, within said dispensing assembly, said escrow cradle includes an edge, and said actuator means is said edge, and said escrow cradle is adapted to transfer a generally cylindrical article.

4. The article dispensing apparatus of claim 3 wherein said dispensing assembly further includes manual operating means connected to said escrow cradle for rotating said escrow cradle, and wherein rotation of said escrow cradle causes the edge of said escrow cradle to alternately shift each one of said first and second gate members from its releasing position to its blocking position, and each gate member is adapted to pivot between the two opposite positions.

5. The article dispensing apparatus of claim 4 wherein, within said dispensing assembly, said first gate member is held in its blocking position by the weight of articles in the second row, and said first gate member is moved towards and held in its releasing position by the weight of articles in the first row.

6. The article dispensing apparatus of claim 5 wherein, within said dispensing assembly, said second gate member is held in its blocking position by a latching member and the weight of articles in the second row helps to shift the second gate member into its release position.

7. The article dispensing apparatus of claim 6, wherein, within said dispensing assembly, said first gate member is a vend rod having
a shaft which extends from a first end adjacent the lower end of said first supporting surface to a second end adjacent the lower end of said second supporting surface, said shaft defining an axis, a blocking part extending out from said first end of said shaft and movable between up and down positions, a gate coacting part extending out from said second end of said shaft and movable between up and down positions, and said vend rod is rotatable about the axis of said shaft to move between its blocking position, whereat said blocking part is up and said gate coacting part is down, to its releasing position, whereat said blocking part is down and said gate coacting part is up.

8. The article dispensing apparatus of claim 5 wherein, within said dispensing assembly, said second gate member is a hinge plate rotatable between up and down positions corresponding respectively with its blocking and releasing positions, and said latching member is a spring-biased pivot plate which latches the hinge plate in an up position.

9. The article dispensing apparatus of claim 7 wherein, within said dispensing assembly, said second gate member is a hinge plate rotatable between up and down positions corresponding respectively with the blocking and releasing positions, and said latching member is a spring-biased pivot plate which latches the hinge plate in an up position, and said gate coating part is held in its down position by the weight of articles in said second row.

10. The article dispensing apparatus of claim 9 wherein, within said dispensing assembly, said shaft of said vend rod is coupled to a release member such that when said hinge plate is latched in an up position rotation of said escrow cradle will rotate said vend rod to cause the release member to release the latching member.

11. The article dispensing apparatus of claim 2 wherein, within said dispensing assembly, each gate member is adapted to pivot between the two opposite positions.

12. The article dispensing apparatus of claim 11 wherein said dispensing assembly further includes a latching member adapted to latch the second gate member in its blocking position.

13. The article dispensing apparatus of claim 12 wherein said dispensing assembly further includes a release member operatively connected to said first gate member such that the shifting of the first gate member from its release position to its blocking position causes the release member to unlatch the latching member.

14. The article dispensing apparatus of claim 13 wherein said dispensing assembly further includes a latching support piece and an antilatching support piece and an antilatching member, said latching member engages and latches to said latching support piece to hold the second gate member in its blocking position, said release member is operative to disengage and unlatch said latching member from said latching support piece, and said antilatching member is adapted to momentarily prevent relatching between said latching member and said latching support piece after unlatching by the release member, thereby allowing said second gate member to shift from its blocking position to its releasing position.

15. The article dispensing apparatus of claim 14 wherein, within said dispenser assembly, said escrow cradle includes an edge, and said actuator means in said edge, and said escrow cradle is adapted to transfer a generally cylindrical article, and rotation of said escrow cradle causes the edge of said escrow cradle to alternately shift each one of said first and second gate members from its releasing position to its blocking position.

16. The article dispensing apparatus of claim 12 wherein, within said dispensing assembly, said latching member is a spring-biased pivot plate mounted on said second gate member.

17. The article dispensing apparatus of claim 16 wherein, within said dispensing assembly, said first gate member is a vend rod having
a shaft which extends from a first and adjacent the lower end of said first supporting surface to a second end adjacent the lower end of said second supporting surface, said shaft defining an axis and having a loop portion in between said first end and said second end, a blocking part extending out from said first end of said shaft and movable between up and down position, a gate coacting part extending out from said second end of said shaft and movable between up and down positions and said vend rod is rotatable about the axis of said shaft to move between its blocking position, whereat said blocking part is up and said gate coacting part is down, to its releasing position, whereat said blocking part is down and said gate coacting part is up.

18. The article dispensing apparatus of claim 17 wherein said dispensing assembly further includes a slider connected with the loop portion of said vend rod shaft, a release member pivotably mounted on said slider, a latching support piece to hold the second gate member in its blocking position, said release member is operative to disengage and unlatch said latching member from said latching support piece, and said antilatching member is adapted to momentarily prevent relatching between said latching member and said latching support piece after unlatching by the release member, thereby allowing said second gate member to shift from its blocking position to its releaseing position.

19. The article dispensing apparatus of claim 18 wherein, within said dispensing assembly, said second gate member is a hinge plate rotatable between up and down positions corresponding respectively with its blocking and its releasing positions, and said antilatching member rotates up and down upon up and down rotation of said hinge plate.

20. An article dispensing apparatus including a dispensing assembly comprising:
(a) first and second side by side supporting surfaces adapted to support associated first and second rows of articles, each supporting surface inclined from an upper end to a lower end,
(b) a rotatable escrow cradle at the lower end of the first and second side by side supporting surfaces, and
(c) an alternator mechanism for feeding articles to said escrow cradle alternately from said first and second rows of articles, and
(d) actuator means cooperating with the alternator mechanism upon rotation of said escrow cradle.

21. The article dispensing apparatus of claim 20 wherein, within said dispensing assembly, said escrow cradle includes an edge, and said actuator means is said edge, and said escrow cradle is adapted to transfer a generally cylindrical article.

22. The article dispensing apparatus of claim 21 wherein, within said dispensing assembly, said alternator mechanism includes first and second gate members respectively associated with said first and second support surfaces, each gate member located adjacent the lower end of the associated support surface, and shiftable between two opposite positions:
(i) a blocking position such that a lowermost article in the associated row is blocked from moving off the lower end of the associated suppor surface,
(ii) a releasing position such that the gate member does not block the lowermost article in the associated for from freely moving off the lower end of the associated support surface.

23. The article dispensing apparatus of claim 22 wherein, within said dispensing assembly, each gate member tends to be held in its releasing position by the weight of articles in the associated row.

24. The article dispensing apparatus of claim 23 wherein, within said dispensing assembly, each gate member changes its position upon the dispensing of an article from the dispensing assembly and the first and second gate member always come to rest in opposite positions until at least one of the support surfaces is emptied of articles.

25. The article dispensing apparatus of claim 22 wherein, within said dispensing assembly, said first gate member is a vend rod having a shaft which extends from a first end adjacent the lower end of said first supporting surface to a second end adjacent the lower end of said second supporting surface, said shaft defining an axis, a blocking part extending out from said first end of said shaft and movable between up and down positions, a gate coacting part extending out from said second end of said shaft and movable between up and down positions, and said vend rod is rotatable about the axis of said shaft to move between its blocking position, whereat said blocking part is up and said gate coacting part is down, to its releasing position, whereat said blocking part is down and said gate coacting part is up, and said second gate member is a hinge plate rotatable between up and down positions corresponding respectively with its blocking and releasing positions, and said dispensing assembly further includes a spring-biased pivot plate which latches the hinge plate in a blocking position.

26. The article dispensing apparatus of claim 1, 3, 10, 11 or 20 including a plurality of said dispensing assemblies.

* * * * *